US012744898B2

(12) United States Patent
Choo et al.

(10) Patent No.: US 12,744,898 B2
(45) Date of Patent: Sep. 22, 2026

(54) OBJECT-BASED IMAGE ENCODING/DECODING METHOD AND APPARATUS

(71) Applicants: Electronics and Telecommunications Research Institute, Daejeon (KR); Konkuk University Industrial Cooperation Corp, Seoul (KR)

(72) Inventors: Hyon Gon Choo, Daejeon (KR); Sang Woon Kwak, Daejeon (KR); Han Shin Lim, Daejeon (KR); Kyoung Ro Yoon, Seoul (KR); Shin Kim, Seoul (KR); Ye Gi Lee, Seoul (KR)

(73) Assignees: Electronics and Telecommunications Research Institute, Daejeon (KR); Konkuk University Industrial Cooperation Corp, Seoul (KR)

( * ) Notice: Subject to any disclaimer, the term of this patent is extended or adjusted under 35 U.S.C. 154(b) by 288 days.

(21) Appl. No.: 18/483,923

(22) Filed: Oct. 10, 2023

(65) Prior Publication Data

US 2024/0129465 A1 Apr. 18, 2024

(30) Foreign Application Priority Data

Oct. 12, 2022 (KR) ........................ 10-2022-0130947
Jul. 26, 2023 (KR) ........................ 10-2023-0097764

(51) Int. Cl.

*H04N 19/11* (2014.01)
*H04N 19/119* (2014.01)
*H04N 19/12* (2014.01)
*H04N 19/124* (2014.01)
*H04N 19/17* (2014.01)
*H04N 19/172* (2014.01)
*H04N 19/18* (2014.01)
*H04N 19/184* (2014.01)

(52) U.S. Cl.

CPC ......... *H04N 19/119* (2014.11); *H04N 19/124* (2014.11); *H04N 19/172* (2014.11); *H04N 19/184* (2014.11)

(58) Field of Classification Search

CPC .. H04N 19/119; H04N 19/124; H04N 19/172; H04N 19/184; H04N 19/17
USPC .......................................................... 382/173
See application file for complete search history.

(56) References Cited

U.S. PATENT DOCUMENTS 11,533,493 B2 12/2022 Wang et al.
2019/0075293 A1* 3/2019 Lim .................... H04N 19/122
2021/0014522 A1* 1/2021 Jung .................... H04N 19/593
2021/0168408 A1* 6/2021 Malakhov .............. H04N 19/52
(Continued)

FOREIGN PATENT DOCUMENTS

KR 10-2022-0130562 A 9/2022

*Primary Examiner* — Allen H Nguyen
(74) *Attorney, Agent, or Firm* — NSIP Law

(57) ABSTRACT

An object-based image encoding/decoding method and device of the present disclosure may include an image partition step which partitions an image to obtain a first object region, a region scaling step which scales the first object region based on a scaling factor of the first object region to obtain a second objection region, a region merging step which merges the second object region with at least one of an object region different from the second object region or a non-object region to obtain a merged image, and an image reconstruction step which reconstructs the merged image.

10 Claims, 5 Drawing Sheets

(56) References Cited

U.S. PATENT DOCUMENTS

2021/0176476 A1* 6/2021 Wang .................. H04N 19/124
2021/0409768 A1* 12/2021 Joshi .................. H04N 19/136
2022/0394303 A1* 12/2022 Sun ...................... H04N 19/70

* cited by examiner

【FIG. 1】

【FIG. 3】
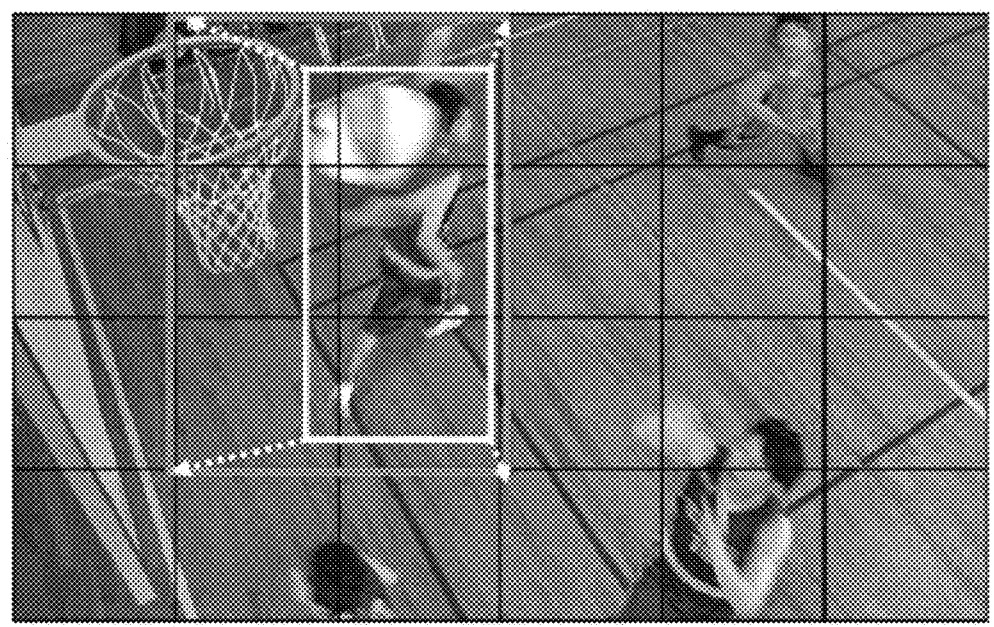
【FIG. 4】
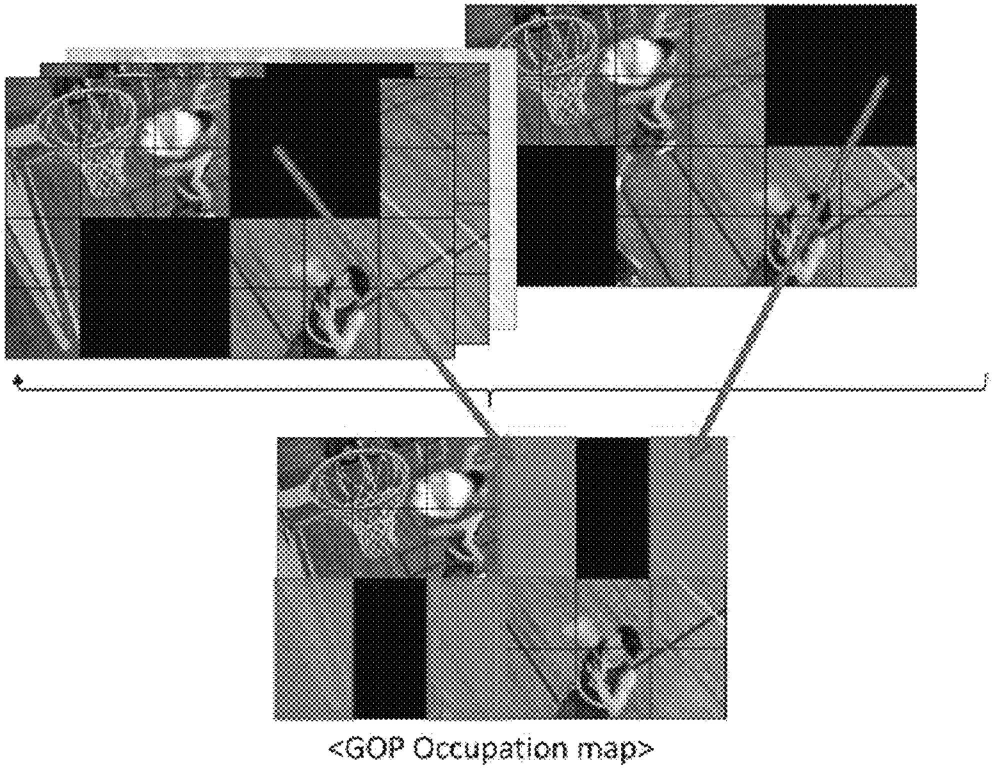

【FIG. 5】
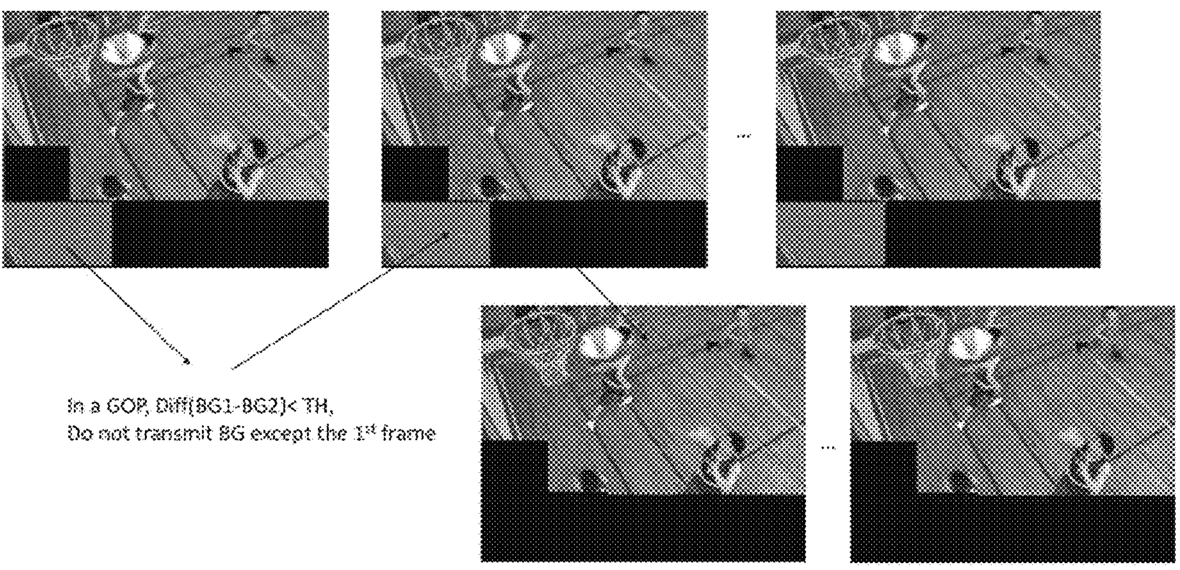
【FIG. 6】
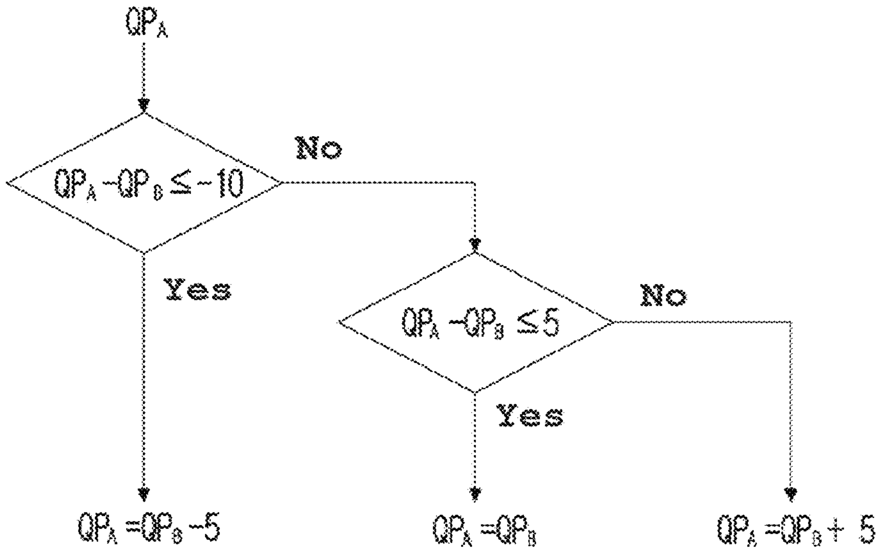

OBJECT-BASED IMAGE ENCODING/DECODING METHOD AND APPARATUS

CROSS-REFERENCE TO RELATED APPLICATIONS

This application claims the benefit of earlier filing date and right of priority to Korean Application No. 10-2022-0130947, filed on Oct. 12, 2022, and priority to Korean Application NO. 10-2023-0097764, filed on Jul. 26, 2023, the contents of which are all hereby incorporated by reference herein in their entirety.

TECHNICAL FIELD

The present disclosure relates to an object-based image encoding/decoding method and device.

BACKGROUND ART

The research for an object-based image encoding technology is actively conducted.

DISCLOSURE

Technical Problem

The present disclosure provides a method and a device for encoding/decoding an image.

Technical Solution

An object-based image encoding/decoding method and device of the present disclosure may include an image partition step which partitions an image to obtain a first object region, a region scaling step which scales the first object region based on a scaling factor of the first object region to obtain a second object region, a region merging step which merges the second object region with at least one of an object region different from the second object region or a non-object region to obtain a merged image and an image reconstruction step which reconstructs the merged image.

In an object-based image encoding/decoding method and device of the present disclosure, partitioning of the image may be partitioning the image into at least one object region and at least one non-object region.

In an object-based image encoding/decoding method and device of the present disclosure, a scaling factor of the first object region may be determined as any one of a plurality of scaling factor candidates of the first object region.

In an object-based image encoding/decoding method and device of the present disclosure, a scaling factor of the first object region may be determined as the minimum value or the maximum value of a scaling factor capable of object search among a plurality of scaling factor candidates of the first object region.

In an object-based image encoding/decoding method and device of the present disclosure, a scaling factor of the first object region may be determined based on an attribute of the first object region.

In an object-based image encoding/decoding method and device of the present disclosure, the second object region may include a region obtained by inversely scaling a region obtained by scaling the first object region based on a scaling factor of the first object region.

In an object-based image encoding/decoding method and device of the present disclosure, the merged image may include a hole which is not an object region or a non-object region.

In an object-based image encoding/decoding method and device of the present disclosure, the hole may be filled with an average value, a median value, a maximum value, a minimum value or a mode value of samples belonging to the image or the second object region.

In an object-based image encoding/decoding method and device of the present disclosure, the region merging step may further include padding a surrounding region of a non-object region of the image with a predetermined sample value.

In an object-based image encoding/decoding method and device of the present disclosure, the image reconstruction step may be performed based on a quantization parameter and the quantization parameter may be determined as the maximum value of a quantization parameter capable of object search among a plurality of quantization parameter candidates.

In an object-based image encoding/decoding method and device of the present disclosure, the quantization parameter may be redetermined based on a comparison result between the quantization parameter and a reference quantization parameter which is pre-defined in an image decoding device.

In an object-based image encoding/decoding method and device of the present disclosure, redetermining the quantization parameter may be redetermining the quantization parameter as the same value as the reference quantization parameter based on the comparison result.

In an object-based image encoding/decoding method and device of the present disclosure, redetermining the quantization parameter may be redetermining the quantization parameter as a value obtained by adding or subtracting a predetermined constant value to or from the reference quantization parameter based on the comparison result.

Technical Effects

According to the present disclosure, image encoding efficiency may be improved.

DESCRIPTION OF DIAGRAMS

FIG. 3 is a diagram showing an example in which an object region is mapped to a region in a predetermined block unit.

FIG. 4 is a diagram showing an example in which region information of a current region is determined by referring to collocated region information in a reference image.

FIG. 5 is a diagram showing an example in which a merged image is generated in one picture group.

FIG. 6 is a diagram showing a process of redetermining a quantization parameter of a quantization parameter region.

BEST MODE

As the present disclosure may make various changes and have several embodiments, specific embodiments will be illustrated in a drawing and described in detail. But, it is not intended to limit the present disclosure to a specific embodiment, and it should be understood that it includes all changes, equivalents or substitutes included in an idea and a technical scope for the present disclosure. A similar reference sign is used for a similar component while describing each drawing.

A term such as first, second, etc. may be used to describe various components, but the components should not be limited by the terms. The terms are used only to distinguish one component from other components. For example, without going beyond a scope of a right of the present disclosure, a first component may be referred to as a second component and similarly, a second component may be also referred to as a first component. A term, and/or, includes a combination of a plurality of relative entered items or any item of a plurality of relative entered items.

When a component is referred to as being "linked" or "connected" to other component, it should be understood that it may be directly linked or connected to other component, but other component may exist in the middle. On the other hand, when a component is referred to as being "directly linked" or "directly connected" to other component, it should be understood that other component does not exist in the middle.

As a term used in this application is only used to describe a specific embodiment, it is not intended to limit the present disclosure. Expression of the singular includes expression of the plural unless it clearly has a different meaning contextually. In this application, it should be understood that a term such as "include" or "have", etc. is to designate the existence of features, numbers, steps, motions, components, parts or their combinations entered in a specification, but is not to exclude the existence or possibility of addition of one or more other features, numbers, steps, motions, components, parts or their combinations in advance.

Figure 1:
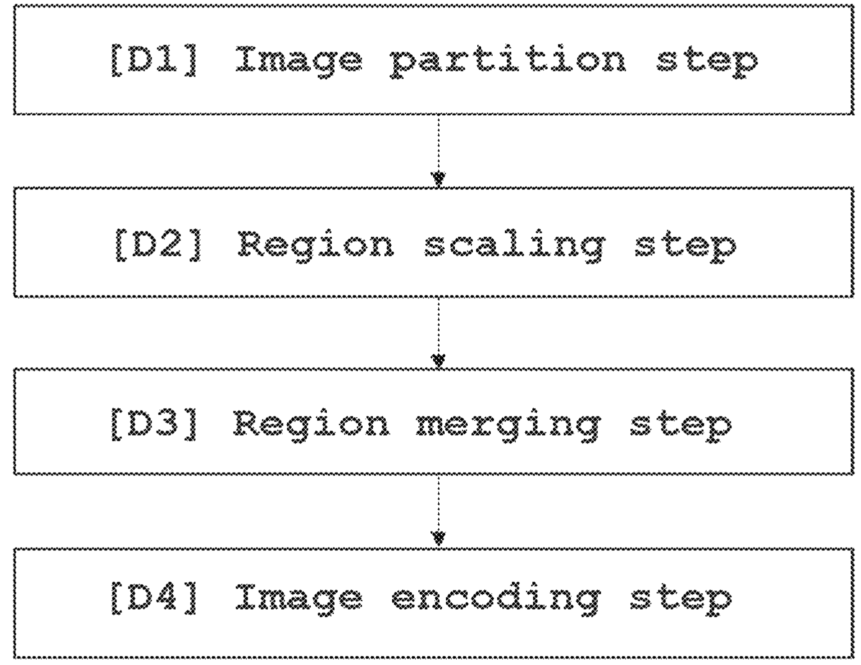
FIG. 1 is a diagram showing an image encoding method according to the present disclosure.

FIG. 1 is a diagram showing an image encoding method according to the present disclosure.

An image encoding method according to the present disclosure may include at least one of [D1] an image partition step, [D2] a region scaling step, [D3] a region merging step or [D4] an image encoding step. In other words, an image encoding method according to the present disclosure may perform all of the above-described steps [D1] to [D4] or some steps may be omitted.

An image according to the present disclosure may mean one frame (or picture) or may mean a segment smaller than a frame, i.e., a subpicture, a slice, a tile or a coding tree unit. For convenience of a description, it is assumed that an image below is one frame.

[D1] Image Partition Step

One image may include one or more object region. Hereinafter, a region configuring one or more object regions is referred to as a first region and the remaining regions excluding a first region in one image is referred to as a second region. In other words, one image may be divided into a first region and a second region and in an image partition step, one image may be largely partitioned into a first region and a second region.

An object region means a region including an object in an image and it may be expressed as a region including a foreground region, a region of interest or a region including an object and a surrounding region of an object. An object region has a rectangular shape, but it is not limited to thereto and may have a triangular or other polygonal shape.

In one image, the remaining regions excluding a first region may be expressed as a non-object region, a background region, a region of non-interest or a region including a non-object and a surrounding region of a non-object. Similarly, one image may include one or more non-object regions.

In an image partition step, one image may be partitioned into one or more object regions and one or more non-object regions.

In this case, the image may be partitioned based on overlapped partition. For example, partition may be performed so that at least one sample is overlapped between a plurality of object regions. Partition may be performed so that at least one sample is overlapped between a plurality of non-object regions. Partition may be performed so that at least one sample is overlapped between an object region and a non-object region.

Alternatively, the image may be partitioned based on non-overlapped partition. For example, partition may be performed so that a plurality of object regions are not overlapped each other. Partition may be performed so that a plurality of non-object regions are not overlapped each other. Partition may be performed so that an object region and a non-object region are not overlapped each other.

In partitioning the image, there may be a limit that the same partition mode is used for an object region and a non-object region. For example, when overlapped partition is allowed for the image, both an object region and a non-object region may be determined/obtained based on overlapped partition. When overlapped partition is not allowed for the image, both an object region and a non-object region may be determined/obtained based on non-overlapped partition.

In partitioning the image, there may be a limit that a different partition mode is used for an object region and a non-object region. For example, overlapped partition may be applied to an object region and non-overlapped partition may be applied to a non-object region. Conversely, non-overlapped partition may be applied to an object region and overlapped partition may be applied to a non-object region.

In an image partition step, in order to partition the image into one or more object regions and one or more non-object regions, at least one of position information or size information of an object region and/or a non-object region may be derived.

Specifically, through object search, an object region and a non-object region may be specified and at least one of position information or size information of each region may be derived. Based on at least one of type information representing whether a type of a corresponding region is an object region or a non-object region, position information of each region or size information of each region, the image may be partitioned into at least one object region and at least one non-object region.

The position information may be obtained for each object region and may be obtained for each non-object region. Alternatively, the position information may be obtained only for an object region and may not be obtained for a non-object region. Similarly, the size information may be obtained for each object region and may be obtained for each non-object region. Alternatively, the size information may be obtained only for an object region and may not be obtained for a non-object region.

Specifically, a relative probability that an object exists in each region may be predicted by using a feature value which is output of a deep learning network and based thereon, at least one of type information, position information or size information described above may be determined.

Figure 2:
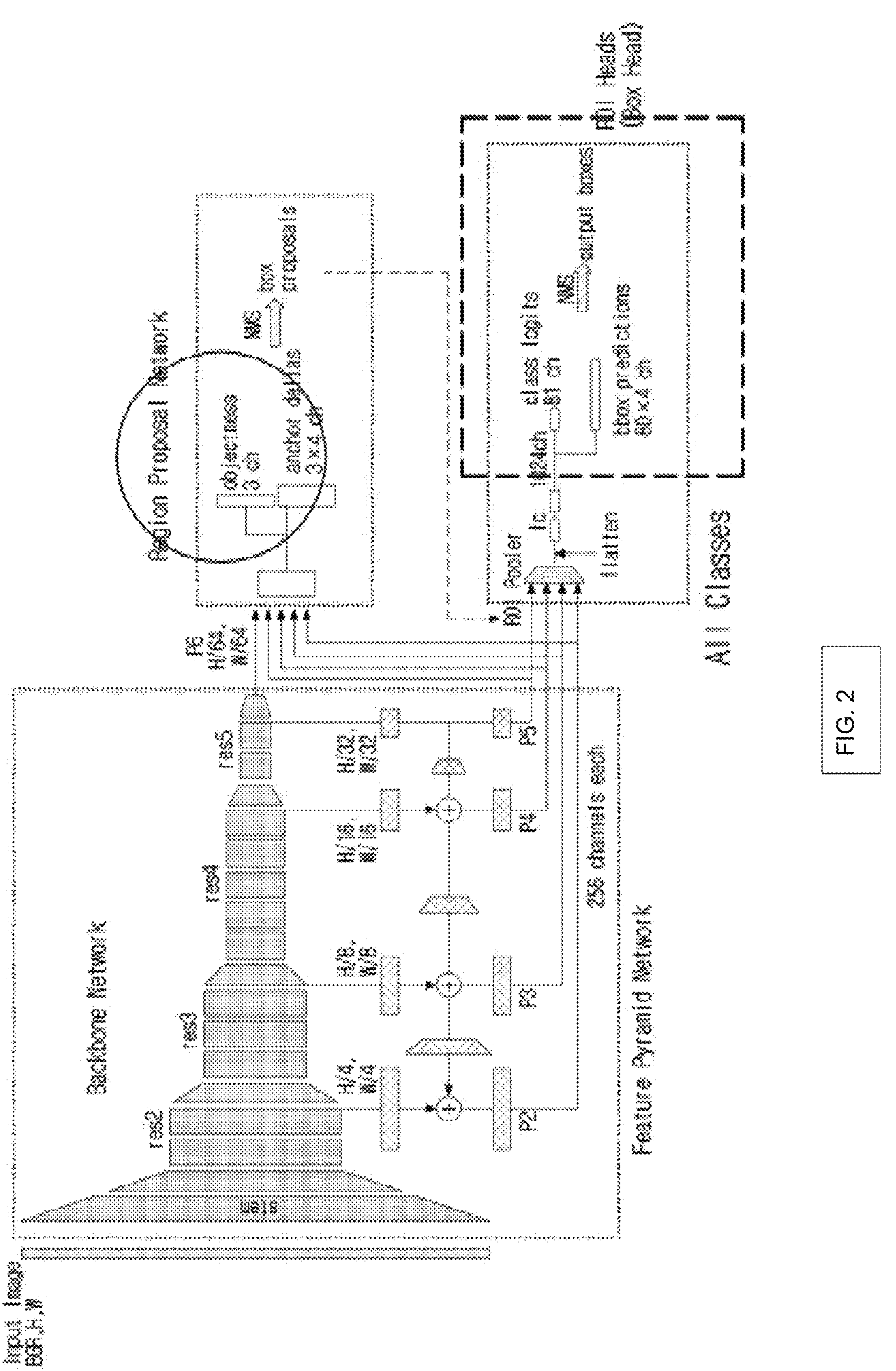
FIG. 2 is a diagram showing a process in which information of a region is determined by using a region proposal network based on a feature value output from at least one layer of a feature pyramid network.

FIG. 2 is a diagram showing a process in which information of a region is determined by using a region proposal network based on a feature value output from at least one layer of a feature pyramid network.

For example, as shown in FIG. 2, at least one of the type information, position information or size information may be determined based on a feature value output from at least one layer of a feature pyramid network. Alternatively, at least one of the type information, position information or size information may be determined by using a region proposal network which uses as input a feature value output from at least one layer of a feature pyramid network.

Position information of an object or non-object region may be expressed as at least one sample in the region. As an example, position information of the region may be expressed by at least one of a top-left sample, a bottom-left sample, a top-right sample, a bottom-right sample or a central sample in the region.

FIG. 3 is a diagram showing an example in which an object region is mapped to a region in a predetermined block unit.

The specified object region may be mapped (or resized) to a region in a predetermined block unit. Through the mapping, at least one of position information or size information of a corresponding object region may be changed.

A predetermined block unit may mean any one of a largest coding unit, a smallest coding unit, a coding unit or a sub coding unit. A region in a predetermined block unit may mean a region entirely configured with the integer number of block units. For example, the region in a block unit may be configured with 1 block unit or may be configured with 2 or more block units.

For example, in reference to FIG. 3, a position of a top-left sample of the specified object region may be changed to a position of a top-left sample in a block unit to which a corresponding top-left sample belongs. Similarly, a position of a bottom-left sample of the specified object region may be changed to a position of a bottom-left sample in a block unit to which a corresponding bottom-left sample belongs. A position of a top-right sample of the specified object region may be changed to a position of a top-right sample in a block unit to which a corresponding top-right sample belongs. A position of a bottom-right sample of the specified object region may be changed to a position of a bottom-right sample in a block unit to which a corresponding bottom-right sample belongs.

Alternatively, a position of a top-left sample of the specified object region may be changed to a position of a top-left sample in a block unit closest to a corresponding top-left sample. Similarly, a position of a bottom-left sample of the specified object region may be changed to a position of a bottom-left sample in a block unit closest to a corresponding bottom-left sample. A position of a top-right sample of the specified object region may be changed to a position of a top-right sample in a block unit closest to a corresponding top-right sample. A position of a bottom-right sample of the specified object region may be changed to a position of a bottom-right sample in a block unit closest to a corresponding bottom-right sample.

In FIG. 3, an example in which a predetermined block unit and an object region are rectangular is used, but a predetermined block unit or an object region may be other polygon, not a rectangle, so for a polygon, the number of samples whose position is changed may be the same as the number of corners of a polygon or may be smaller than the number of the corners.

The mapping process may be applied equally to a non-object region. Alternatively, there may be a limit that the mapping process is not performed for a non-object region. Through the above-described mapping process, a size of at least one of an object region or a non-object region may be enlarged or reduced. Object search may be performed in a block unit described above and in this case, the mapping process may be omitted regardless of whether a type of a region is an object region.

Additionally, a type of a region determined through the object search may be redetermined by comparing whether it is the same as a type of a collocated region in other image. Alternatively, a type of a region determined through the object search may be redetermined by comparing it to a type of a region corresponding to a region determined through the object search determined based on encoding/decoding information (e.g., a motion vector).

Here, other image may be at least one of a plurality of pictures belonging to a predetermined picture group (GOP). The other image may be one or more images that object search is completed before a current image which is a target for object search (hereinafter, referred to as a reference image). The current image may refer to a first picture among a plurality of pictures belonging to a picture group. The current image may refer to a picture with the earliest encoding order among a plurality of pictures belonging to a picture group. The current image may refer to a picture with the earliest output order, i.e., with the smallest picture order count (POC) value among a plurality of pictures belonging to a picture group.

The comparison may be performed for all pictures except for the current image among a plurality of pictures belonging to a picture group. Alternatively, the comparison may be performed only for any one picture among a plurality of pictures belonging to a picture group. For example, the any one picture, as a picture neighboring a current image, may refer to a picture which is encoded after a current image or a picture which is output after a current image. The any one picture may refer to a second picture among a plurality of pictures belonging to a picture group.

When a type of a current region in a current image is the same as a type of a collocated region in a reference image, a type of a current region may be maintained as it is. On the other hand, when a type of a current region in a current image is different from a type of a collocated region in a reference image, a type of a current region may be changed to a different type.

FIG. 4 is a diagram showing an example in which region information of a current region is determined by referring to collocated region information in a reference image.

For example, in reference to FIG. 4, when a type of a current region in a current image is an object region and a type of a collocated region in a reference image is an object region, a type of a current region may be maintained as an object region. When a type of a current region in a current image is a non-object region and a type of a collocated region in a reference image is a non-object region, a type of a current region may be maintained as a non-object region.

On the other hand, when a type of a current region in a current image is an object region and a type of a collocated region in a reference image is a non-object region, a type of a current region may be changed to a non-object region. Alternatively, when a type of a current region in a current image is a non-object region and a type of a collocated region in a reference image is an object region, a type of a current region may be changed to an object region.

A type of a collocated region in a reference image described above may mean a type of a collocated region in one reference image or may be determined as a type with a high frequency among types of a plurality of collocated regions in a plurality of reference images.

For example, when a type of a current region is an object region, but a type of a plurality of collocated regions in a plurality of reference images is a non-object region and N regions have a type different from the current region, a type of a current region may be changed to a non-object region when a difference value N−1 is greater than a pre-defined threshold value. On the contrary, when the difference value N−1 is equal to or smaller than a pre-defined threshold value, a type of a current region may be maintained as an object region. Here, N may be a natural number greater than 2 such as 2, 3, 4, 5. The threshold value may be a natural number equal to or greater than 1, 2, 3, 4, 5.

Conversely, even when a type of a current region is a non-object region and a type of a plurality of collocated regions in a plurality of reference images is an object region, a type of a current region may be redetermined according to the same method as above.

[D2] Region Scaling Step

An object region belonging to a current image may be scaled based on a predetermined scaling factor. Here, scaling may mean adjusting at least one of a spatial resolution or an image quality resolution of an image.

The scaling factor may be an optimal scaling factor determined in an image encoding device. The scaling factor may be any one of a plurality of scaling factor candidates which are pre-defined in an image encoding device. In addition, the scaling factor may be the minimum value (or the maximum value) of a scaling factor capable of object search among the plurality of scaling factor candidates. On the contrary, the scaling factor may be specified by index information signaled from a bitstream representing any one of the plurality of scaling factor candidates.

The number of a plurality of scaling factor candidates may be a natural number equal to or greater than 2 such as 2, 3, 4, 5, 6. The number of a plurality of scaling factor candidates may be determined by information signaled from a bitstream or may be determined by encoding/decoding information. Encoding/decoding information may include information necessary for encoding/decoding of an image.

A plurality of scaling factor candidates may be determined by referring to other region having the same type as a current region. In an example, a scaling factor candidate of a first object region of a current image may be determined by referring to a scaling factor of a second object region. In addition, a plurality of scaling factor candidates may be determined based on a current region or a surrounding region of a region to which a current region is mapped. In an example, a scaling factor candidate of a current region may be determined by referring to a scaling factor of a region adjacent to the top, bottom, bottom-left, top-left, top-right, bottom-right, left or right of a current region.

A scaling factor may be determined for each object region belonging to a current image and may be determined differently according to an attribute of each object region (hereinafter, referred to as an adaptive mode). Alternatively, regardless of an attribute of each object region, the same scaling factor may be forced to be applied to all object regions belonging to a current image (hereinafter, referred to as a default mode). When a default mode is applied, a default scaling factor which is pre-defined in an image encoding/decoding device may be used.

In a region scaling step, any one of an adaptive mode or a default mode may be selectively used for a current image or an object region of a current image. To this end, a region scaling step may further include determining whether to apply an adaptive mode or a default mode to a current image or an object region of a current image.

A non-object region of a current image may be scaled based on a default scaling factor according to the above-described default mode. There may be a limit that a scaling factor according to an adaptive mode is not used for a non-object region. But, it is not limited thereto, and any one of an adaptive mode or a default mode may be selectively used even for a non-object region. In this case, a region scaling step may further include determining whether to apply an adaptive mode or a default mode to a current image or a non-object region of a current image.

Meanwhile, the scaling may mean one-step based scaling or may mean multi-step based scaling. Here, one-step based scaling may mean applying a scaling factor determined according to any one of an adaptive mode or a default mode to a corresponding region one time. Multi-step based scaling may mean recursively/repeatedly applying a scaling factor determined according to any one of an adaptive mode or a default mode to a corresponding region.

Whether to apply an adaptive mode or a default mode to a current image or a region of a current image may be determined by flag information signaled from a bitstream. Alternatively, whether to apply an adaptive mode or a default mode to a current image or a region of a current image may be determined based on information of a current image or region information of a current image (e.g., type information, position information, size information).

Meanwhile, in a region scaling step, the scaled region may be inversely scaled to correspond to a resolution of an original region. There may be a limit that descaling is applied only to a scaled object region. But, it is not limited thereto, and descaling may be applied not only to a scaled object region, but also to a scaled non-object region. A scaling factor for descaling may be determined based on a scaling factor determined according to any one of an adaptive mode or a default mode described above.

A region scaling step may further include determining whether to perform descaling for a scaled region. According to the determination result, the above-described descaling process may be performed adaptively. Whether to perform descaling may be determined in an image unit or may be determined for each scaled region.

For example, whether descaling is performed for a current image may be determined. Even when it is determined that descaling is performed for a current image, whether to perform descaling for each scaled region may be additionally determined. Alternatively, a determination on whether to perform descaling at a current image level may be omitted. Alternatively, a determination on whether to perform descaling at a scaled region level may be omitted.

[D3] Region Merging Step

In a region merging step, one image (hereinafter, referred to as a merged image) may be generated by merging one or more scaled object regions and one or more scaled non-object regions which are output in [D2] a region scaling step.

A Hole may exist in a merged image. The hole may be positioned between a plurality of object regions. The hole may be positioned between a plurality of non-object regions. The hole may be positioned between an object region and a non-object region. The hole may be filled with a predetermined first sample value. Here, a first sample value may be determined as an average value, a median value, the maximum value, the minimum value or a mode of a sample belonging to a current image or an object region of a current image. Alternatively, a first sample value may be set as a pre-defined value in an image encoding/decoding device.

Meanwhile, a region merging step may further include padding a surrounding region of a non-object region with a predetermined second sample value. Here, a second sample value may be determined as an average value, a median value, the maximum value, the minimum value or a mode of a sample belonging to a current image or a non-object region of a current image. Alternatively, a second sample value may be set as a pre-defined value in an image encoding/decoding device.

Meanwhile, in a region merging step, a non-object region may be selectively merged. In other words, a merged image may include both an object region and a non-object region or may include only an object region.

FIG. 5 is a diagram showing an example in which a merged image is generated in one picture group.

For example, in reference to FIG. 5, when a difference between a sample value of a non-object region corresponding to a first picture and a sample value of a non-object region corresponding to a second picture is smaller than a predetermined threshold value in one picture group, a non-object region corresponding to a second picture may not be merged into a merged image corresponding to a second picture. In this case, a non-object region corresponding to a first picture may be merged into a merged image corresponding to a first picture.

[D4] Image Encoding Step

In an image encoding step, a merged image which is output of [D3] a region merging step may be encoded.

Encoding of the merged image may be performed based on a predetermined quantization parameter. Here, a quantization parameter may be an optimal quantization parameter determined in an image encoding device. The quantization parameter may be any one of a plurality of quantization parameter candidates which are pre-defined in an image encoding device. In addition, the quantization parameter may be the maximum value of a quantization parameter capable of object search among the plurality of quantization parameter candidates. Alternatively, the quantization parameter may be the minimum value, a median value or an average value of a quantization parameter capable of object search among the plurality of quantization parameter candidates.

The quantization parameter may be determined in a unit of a picture group described above. The quantization parameter may be determined for each picture (i.e., image) belonging to a picture group. The quantization parameter may be determined for each of an object region and a non-object region in a current image. The quantization parameter may be determined for each region mapped (resized) to an object or non-object region of a current image.

When a plurality of object regions exist in a current image, a quantization parameter may be determined for each of a plurality of object regions and may be determined differently according to an attribute of each object region (hereinafter, referred to as an adaptive mode). Alternatively, regardless of an attribute of each object region, the same quantization parameter may be forced to be applied to all object regions belonging to a current image (hereinafter, referred to as a default mode). When a default mode is applied, a default quantization parameter which is pre-defined in an image encoding/decoding device may be used.

In an image encoding step, for a current image or an object region of a current image, any one of an adaptive mode or a default mode may be selectively used. To this end, an image encoding step may further include determining whether to apply an adaptive mode or a default mode to a current image or an object region of a current image.

A non-object region of a current image may be encoded based on a default quantization parameter according to the above-described default mode. There may be a limit that a quantization parameter according to an adaptive mode is not used for a non-object region. But, it is not limited thereto, and any one of an adaptive mode or a default mode may be selectively used even for a non-object region. In this case, an image encoding step may further include determining whether to apply an adaptive mode or a default mode to a current image or a non-object region of a current image.

Whether to apply an adaptive mode or a default mode to a current image or a region of a current image may be determined by flag information signaled from a bitstream. Alternatively, whether to apply an adaptive mode or a default mode to a current image or a region of a current image may be determined based on information of a current image or region information of a current image (e.g., type information, position information, size information).

A default quantization parameter which is pre-defined for an object region may be the same as a default quantization parameter which is pre-defined for a non-object region. Alternatively, a size of a default quantization parameter may be defined differently according to a type of a region.

A quantization parameter determined through the above-described method may be redetermined based on a reference quantization parameter (Base QP) which is pre-defined in an image encoding/decoding device. Here, a reference quantization parameter may be interpreted as being the same as the above-described default quantization parameter or may be interpreted as being separately defined for a redetermination of a quantization parameter. A redetermination of the quantization parameter is to reduce such a difference from a reference quantization parameter when a difference between a reference quantization parameter and a quantization parameter of an object region is greater than a predetermined threshold value.

FIG. 6 is a diagram showing a process of redetermining a quantization parameter of a quantization parameter region.

For example, in reference to FIG. 6, when a difference between a quantization parameter ($QP_A$) of an object region and a reference quantization parameter ($QP_B$) is smaller than or equal to a predetermined first threshold value, a quantization parameter of an object region may be redetermined as a value obtained by subtracting a predetermined constant value from a reference quantization parameter.

On the other hand, when a difference between a quantization parameter ($QP_A$) of an object region and a reference quantization parameter ($QP_B$) is greater than a predetermined first threshold value, a quantization parameter of an object region may be redetermined as the same value as a reference quantization parameter or may be redetermined as a value obtained by adding the constant value to a reference quantization parameter.

Alternatively, when a difference between a quantization parameter ($QP_A$) of an object region and a reference quantization parameter ($QP_B$) is greater than a predetermined first threshold value, whether a difference between a quantization parameter ($QP_A$) of an object region and a reference quantization parameter ($QP_B$) is greater than a predetermined second threshold value may be additionally determined.

As a result of the determination, when a difference between a quantization parameter ($QP_A$) of an object region and a reference quantization parameter ($QP_B$) is smaller than or equal to a predetermined second threshold value, a quantization parameter of an object region may be redetermined as the same value as a reference quantization parameter. On the other hand, when a difference between a quantization parameter ($QP_A$) of an object region and a reference quantization parameter ($QP_B$) is greater than a predetermined second threshold value, a quantization parameter of an object region may be redetermined as a value obtained by adding the constant value to a reference quantization parameter.

At least one of the first threshold value or the second threshold value may be a negative number, and an absolute value of any one of a first threshold value or a second threshold value may be greater than or equal to 10 and an absolute value of the other may be smaller than or equal to 5.

A quantization parameter of a non-object region may be redetermined based on a reference quantization parameter. A quantization parameter of a non-object region may be redetermined without considering a difference from a predetermined threshold value. For example, a quantization parameter of a non-object region may be set as a reference quantization parameter. Alternatively, a quantization parameter of a non-object region may be redetermined as a value obtained by adding a predetermined constant value to a reference quantization parameter. A constant value here may be the same as a constant value for redetermining a quantization parameter of an object region. Alternatively, a constant value here may be defined separately from a constant value for redetermining a quantization parameter of an object region. A constant value for a non-object region may be greater than a constant value for an object region. A size of a constant value for a non-object region may be equal to or greater than 10 and a size of a constant value for an object region may be smaller than or equal to 5.

A bitstream may be generated through encoding of the merged image. An image encoding step may encode a result of a determination performed in steps [D1] to [D4] and insert it into a bitstream.

Figure 7:
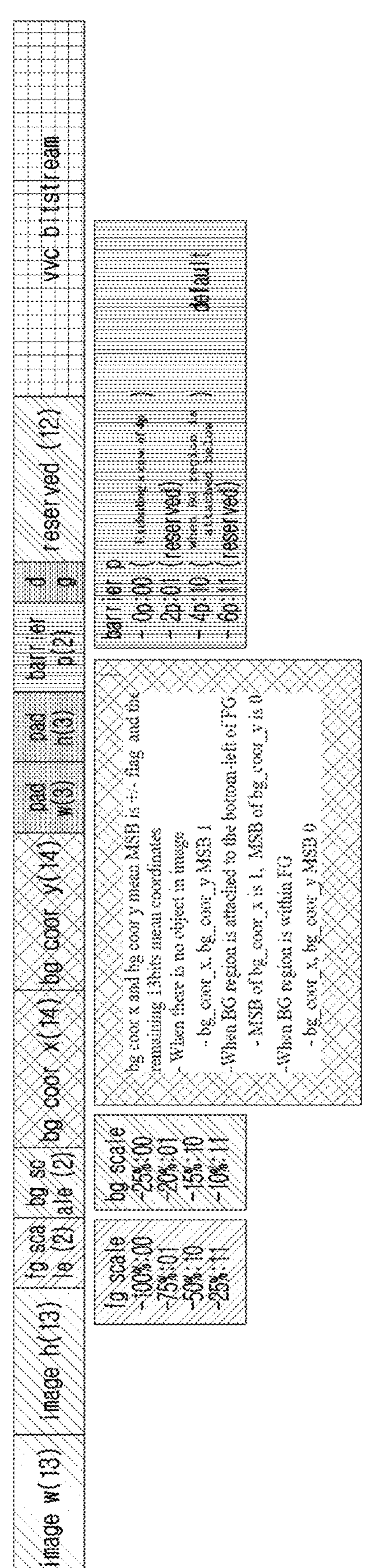
FIG. 7 is a diagram showing an example of a bitstream structure including information for image decoding.

FIG. 7 is a diagram showing an example of a bitstream structure including information for image decoding.

Additionally, an image encoding step may insert additional information for image decoding into a header of the bitstream. For example, in reference to FIG. 7, the additional information may include at least one of image resolution information (image w, image h), a scaling factor of an object region (fg scale), a scaling factor of a non-object region (bg scale), position information of a non-object region in a merged image (bg coor x, bg coor y), padding information (padding w, padding h), a barrier sample (barrier pixel) or information related to selective merge of a non-object region.

An image decoding method according to the present disclosure may include at least one of [D5] an image decoding step, [D6] an image partition step, [D7] a region scaling step or [D8] an image reconstruction step. In other words, an image decoding method according to the present disclosure may perform all of the steps [D5] to [D8] described above or some steps may be omitted. Image decoding is performed in reverse order of the above-described image encoding method and an overlapped description is omitted.

[D5] Image Decoding Step

An image decoding step may decode an input image. Here, a decoded image may be an image that one or more object regions and one or more non-object regions are merged, i.e., a merged image. Image decoding may be performed based on information related to a quantization parameter signaled through a bitstream.

[D6] Image Partition Step

An image partition step may specify one or more object regions and one or more non-object regions from a merged image which is output of step [D5]. One merged image may be partitioned into one or more object regions and one or more non-object regions. The specification/partition of an object region and a non-object region may be performed based on information signaled through a bitstream. Here, information may include information about a type of a region, number/size/position information of a region, etc.

[D7] Region Scaling Step

A region scaling step may scale each of an object region and a non-object region belonging to a merged image. Scaling here may mean descaling of scaling in step [D2]. The scaling may be performed based on information related to a scaling factor signaled through a bitstream.

[D8] Image Reconstruction Step

In an image reconstruction step, an image may be reconstructed based on a scaled object region and non-object region.

When embodiments described based on a decoding process or an encoding process are applied to an encoding process or a decoding process, it is included in a scope of the present disclosure. When embodiments described in predetermined order are changed in order different from a description, it is also included in a scope of the present disclosure.

The above-described disclosure is described based on a series of steps or flow charts, but it does not limit time series order of the present disclosure and if necessary, it may be performed at the same time or in different order. In addition, each component (e.g., a unit, a module, etc.) configuring a block diagram in the above-described disclosure may be implemented as a hardware device or software and a plurality of components may be combined and implemented as one hardware device or software. The above-described disclosure may be recorded in a computer readable recoding medium by being implemented in a form of a program instruction which may be performed by a variety of computer components. The computer readable recoding medium may include a program instruction, a data file, a data structure, etc. solely or in combination. An example of a computer readable recoding medium includes magnetic media such as a hard disk, a floppy disk and a magnetic tape, optical recording media such as a CD-ROM and a DVD, magneto-optical media such as a floptical disk and a hardware device which is specially configured to store and execute a program instruction such as ROM, RAM, a flash memory, etc. The hardware device may be configured to operate as at least one software module in order to perform processing according to the present disclosure and vice versa. A device according to the present disclosure may have a program instruction for storing or transmitting a bitstream generated by the above-described encoding method.

What is claimed is:

1. An object-based image encoding method with an encoding apparatus, the method comprising:

partitioning, with the encoding apparatus, an image to obtain a first object region;

scaling, with the encoding apparatus, the first object region based on a scaling factor of the first object region to obtain a second object region;

wherein a spatial resolution of the second object region is different from a spatial resolution of the first object region, wherein the scale factor is a maximum value among scale factor candidates capable of object search in the image, merging, with the encoding apparatus, the second object region with at least one of an object region different from the second object region or a non-object region to obtain a merged image; and reconstructing, with the encoding apparatus, the merged image.

2. The method of claim 1, wherein the partitioning of the image comprises partitioning the image into at least one object region and at least one non-object region.

3. The method of claim 1, wherein the second object region includes a region obtained by inversely scaling a region obtained by scaling the first object region based on the scaling factor of the first object region.

4. The method of claim 1, wherein the merged image includes a hole which is not the object region or the non-object region.

5. The method of claim 4, wherein the hole is filled with an average value, a median value, a maximum value, a minimum value or a mode value of samples belonging to the image or the second object region.

6. The method of claim 1, wherein the merging of the second object region includes padding a neighboring region of the non-object region of the image with a predetermined sample value.

7. The method of claim 1, wherein the reconstructing the merged image is performed based on a quantization parameter, and wherein the quantization parameter is determined as a maximum value of a quantization parameter capable of object search among a plurality of quantization parameter candidates.

8. The method of claim 7, wherein the quantization parameter is redetermined based on a comparison result between the quantization parameter and a reference quantization parameter which is pre-defined in the encoding apparatus.

9. The method of claim 8, wherein redetermining the quantization parameter is redetermining the quantization parameter as a same value as the reference quantization parameter based on the comparison result.

10. The method of claim 8, wherein redetermining the quantization parameter is redetermining the quantization parameter as a value obtained by adding or subtracting a predetermined constant value to or from the reference quantization parameter based on the comparison result.

* * * * *